United States Patent [19]

Lindblom et al.

[11] 3,996,104

[45] Dec. 7, 1976

[54] PROCESS FOR PREPARING FROM A MICROBIAL CELL MASS A PROTEIN CONCENTRATE HAVING A LOW NUCLEIC ACID CONTENT, AND THE PROTEIN CONCENTRATE THUS OBTAINED

[75] Inventors: Marianne Gunilla Lindblom, Bromma; Håkan Lars Mogren, Solna, both of Sweden

[73] Assignee: SCP-exploatering AB, Solna, Sweden

[22] Filed: Jan. 21, 1975

[21] Appl. No.: 542,824

[30] Foreign Application Priority Data

Feb. 7, 1974 Sweden .............................. 7401668

[52] U.S. Cl. ............................................ 195/5; 426/7; 426/60; 260/112 R
[51] Int. Cl.$^2$ .......................................... A23J 1/18
[58] Field of Search ........ 195/5, 28 N; 260/112 R; 426/60, 148, 204, 7; 241/2, 17, 23

[56] References Cited

UNITED STATES PATENTS

| 3,720,585 | 3/1973 | Tannenbaum et al. .......... 426/62 X |
| 3,821,080 | 6/1974 | Kalina et al. .................. 260/112 X |
| 3,867,255 | 2/1975 | Newell et al. ................. 260/112 X |

*Primary Examiner*—R.B. Penland
*Attorney, Agent, or Firm*—Toren, McGeady and Stanger

[57] ABSTRACT

The invention relates to a process for preparing a protein concentrate having a low nucleic acid content starting from a microbial cell mass. By subjecting a suspension of the cell mass to a mechanical disintegration followed by an incubation in the presence of a salt at 30°–70° C and at a pH of 5–9 the nucleic acid contained in the mass is degraded, the degradation products being separated from the protein and a protein concentrate being obtained. The invention also relates to the protein concentrate thus obtained.

25 Claims, No Drawings

PROCESS FOR PREPARING FROM A MICROBIAL CELL MASS A PROTEIN CONCENTRATE HAVING A LOW NUCLEIC ACID CONTENT, AND THE PROTEIN CONCENTRATE THUS OBTAINED

The present invention relates to a process for preparing from a microbial cell mass a protein concentrate having a low nucleic acid content, by cell wall degradation followed by recovery of the released protein. The invention also relates to the protein concentrate thus obtained.

It has been found that the ability of the human organism to utilize the protein part of the microbial cell mass, is very limited if the latter is included in nutrients without previous processing. This fact is presumed to be due to the circumstance that the cell walls preclude intimate contact between the cell content and the digestive system. A first prerequisite where the utilization of microbial protein is concerned, therefore, must be a degradation of the cell walls so that the protein is more readily accessible. A degradation can be produced amongst other things by chemical methods, enzymatically, by heat treatment or by mechanical methods, for example by milling.

Even if this kind of degradation of the cell walls is carried out in order to increase the protein yield, difficulties are nevertheless encountered. Thus, the protein is essentially present in association with nucleic acids or components thereof. A high nucleic acid content, primarily ribonucleic acid (RNA), renders the cell mass unsuitable for consumption because the consumer experiences negative side effects.

In order to be able to utilize the microbial protein for human consumption it is therefore necessary to prepare from the microbial starting material, the cell mass, a protein concentrate with a reduced nucleic acid content.

One technical method of preparing a protein concentrate with a low nucleic acid content is disclosed in the U.S. Pat. No. 3,848,812. This method involves separation of protein and nucleic acid in the disintegrated cell mass, by selectively precipitating the protein, i.e. the nucleic acid remains in solution, the precipitation being achieved by the use of heat and an optimum pH value. This thermal precipitation, however, inherently involves some denaturation of the protein structure, limiting the possible number of nutrient preparations which can be produced.

The present invention relates to a novel technical process by means of which the above drawback of thermal denaturation of the protein structure, is obviated. The process according to the invention involves the preparation of a protein concentrate with a very low nucleic acid content, by a combination of mechanical disintegration and incubation of the disintegrated cell mass in the presence of a salt which is acceptable for human consumption, the process being carried out at moderate temperature. According to the invention the nucleic acid reduction is achieved enzymatically, that is to say by virtue of the fact that endogenous ribonuclease, RNase, is activated and degrades the RNA so that the nucleic acid degradation products can then readily be separated from the protein concentrate.

The process according to the invention thus constitutes a worthwhile alternative to the thermal precipitation method disclosed in the U.S. Pat. No. 3,848,812, in the sense that in the two cases protein concentrates are obtained which have different functional properties. For example, the nitrogen solubility is higher if the concentrate is prepared by the process according to the present invention. The two types of concentrate can therefore be used for different nutrient applications. The nitrogen yield and the nucleic acid reduction are of the same order of magnitude in both instances. One technical advantage of the present process is the better separation properties of the suspension following the precipitation of the protein, this involving lower costs in the separation stage. Another circumstance which can affect the choice of method, is the fact that the dilute phase in the thermal precipitation method contains high-molecular nucleic acid, whilst the dilute phase in the process according to the present invention contains nucleic acid degradation products.

The object of the present invention is achieved by forming a suspension of the cell mass, by subjecting the suspended cell mass to a mechanical disintegration treatment by incubating the suspension in the presence of a salt which is acceptable for human consumption, and at a temperature of 30°–70° C and a pH value of 5–9, and by separating the protein concentrate.

Thus, it has unexpectedly been found that by carrying out the cell wall degradation operation mechanically, and adding a salt to the disintegrated cell mass, endogenous enzymes are activated so that the nucleic acid in the ensuing incubation stage carried out at a given temperature and given pH value is degraded.

The mechanism of this enzyme degradation process is not fully understood. However, where yeast cells are concerned it is known that the RNA is localized in the nucleus, mitochondria, ribosomes and cytoplasm. RNase has been encountered in the vacuoles and in association with the ribosomes. The mechanical disintegration probably produces destruction of the subcellular organisation, giving rise to fresh possibilities of action by the RNase on the RNA. The function of the salt in the enzymatic degradation process, is not known.

Accordingly, the disintegration of the cell mass must be produced mechanically in order to achieve the desired result. One advantage with this form of degradation is that the cell protein is not affected in such a way that its value as a nutrient is impaired. Furthermore, the disintegration is performed in such a fashion that the cell walls of as many of the cells as possible, are degraded but under condition such that the RNase is not inactivated. For example, the temperature must not exceed 70° C. Disintegration will preferably be carried out in a homogenizer provided with milling particles, or in a pressure homogenizer, for example a Manton-Gaulin homogenizer. The milling particles should consist of a material which is acceptable in the foodstuffs industry, for example certain qualities of glass or steel. For yeast and bacteria, spherical milling particles with a diameter of less than 2 mm, preferably 0.45–0.75 mm, can advantageously be used. In continuous operation, optimum disintegration conditions can easily be achieved. The milling particles are thereby continuously separated off, for example by means of a strainer apparatus.

A major feature of the process according to the invention is thus, the presence of salt at the incubation stage. The salt will preferably be added after the mechanical disintegration phase, although it could be carried out prior to or during said phase should the disintegration apparatus be made of such a material that there is no risk of any adverse corrosion. If the salt is not present, no enzymatic degradation of the nucleic acid takes place. In this context, it should be pointed out that a certain so-called basic reduction of the nucleic acid content is always achieved on precipitation of protein, but that this reduction is due to losses (in this case positive) in the precipitation process and that this reduction does not increase with incubation in the absence of salt. Addition of salt to suspensions of undisintegrated cells, produces no nucleic acid reduction following incubation.

By way of salt, it is possible to use any salt which is acceptable for human consumption for example sodium chloride, disodium hydrogen phosphate, sodium dihydrogen phosphate, potassium chloride, dipotassium hydrogen phosphate, potassium dihydrogen phosphate and calcium chloride. The preferred salt is sodium chloride, this not least from the cost point of view. The process according to the invention can, of course, also utilize different combinations of any of the above salts.

Even a very small salt additive, such as 0.1% by weight based upon the weight of the suspension, yields a striking reduction in nucleic acid. With an additive of 1% by weight of salt, an RNA reduction in the order of magnitude of 75% by weight can be achieved, whilst the maximum RNA reduction, which is in the order of magnitude of 85% by weight, is achieved at a salt content of about 3% by weight. The RNA reduction in the protein concentrate, is based upon the RNA content in suspension prior to incubation. An increase of the salt content to beyond about 3% by weight, produces no further improvement in the RNA reduction. Contents of more than 3% by weight up to at least about 5% by weight, however, produce no appreciable impairment of the RNA reduction. Thus, the salt content should preferably be between 0.1 and 5% by weight and more preferably between 1 and 3% by weight. The upper limit of the salt content is not critical and is determined by economic factors as well as by the salt content which can be tolerated in the protein concentrate for human consumption. In this context, it should be pointed out, however, that salt present in the protein precipitate can be washed off with water, and further mention of this will be made hereinafter. The salt content should not exceed 20% by weight however.

The viable temperature range for incubation is 30°–70° C. Preferably, however, a temperature within the range of 40°–65° C, and more preferably within the range of 48°–62° C, will be used. Within the range of 48°–62° C, the RNA reduction is in effect virtually constant whilst it decreases markedly below 48° C as well as above 62° C.

The desired result is achieved at a pH value during incubation, within the range of 5–9. According to a preferable embodiment of the invention, the pH value is maintained within the range of 5–7 and more preferably within the range of 5–6. At a pH value of below about 5, precipitation of the protein takes place whilst at pH values in excess of about 9, the active enzymes are destroyed.

The time for which incubation is carried out, is not critical where the process of the invention is concerned. Under conditions which are otherwise optimum, the maximum RNA reduction is achieved after as little as 15–20 minutes. The reduction in the nitrogen yield obtained during this time, that is to say the nitrogen content in the protein concentrate in relation to the nitrogen content in the suspension prior to incubation, is due for all practical purposes exclusively to the RNA reduction. Any further increase in the incubation time, that is to say in excess of the time within which the maximum RNA reduction is achieved, leads to a reduction in the nitrogen yield. This reduction in the nitrogen yield is probably due to a protein degradation, for which reason incubation should be discontinued as soon as the desired result in terms of nucleic acid reduction is achieved.

The process according to the invention can be applied to different types of microorganisms, for example yeast and bacteria suitable for human consumption. Examples of the microorganisms which can be used, include Saccharomyces cerevisiae, Saccharomyces carlsbergensis, Candida yeast as well as methane-oxidizing and methanol-oxidizing microorganisms such as Pseudomonas bacteria.

The RNA reduction is not appreciably affected by variations in the concentrations of dry cell mass in the suspension during incubation. A preferable concentration is between 2 and 19% by weight but this is not critical where the process of the invention is concerned.

Incubation will preferably be discontinued by cooling the suspension down to a temperature below 30° C and/or by adjustment of the pH value of the suspension to a value below 5. Even if a certain degree of insolubilization of the protein should occur during incubation, the yield will be improved if the pH value is reduced below 5, for example by the addition of HCl, a rapid precipitation being obtained. The protein precipitation will preferably be regulated using a method well known to those skilled in the art, for example by careful stirring or giving the HCl solution which is added, a suitable concentration, so that precipitation takes place in flocculate form, this being easier to separate than a fine-grained precipitate.

After protein precipitation has been completed, the suspension is separated in a manner known per se, for example by filtration, sedimentation or centrifugal separation. The nucleotides and salts are here encountered in both the more dilute and the more viscid phases, the latter forming the protein precipitate. Wherever possible, separation should be carried out in such a fashion that the more viscid phase, that is to say the protein precipitate, has the smallest possible volume. In this fashion, the quantity of the liquid containing dissolved nucleotides and dissolved salt, embodied in this phase, is reduced. Because nucleotides are just as undesirable where human consumption is concerned, as is RNA, it is possible, if required, to further reduce the quantity of nucleotides simply by washing with water. By means of this washing operation, the salts contained in the precipitate are also removed.

If required, the protein concentrate obtained after separation (and washing), can be dried in a conventional manner, for example by spray drying. Whether drying should be carried out or not, will naturally depend upon the form in which the protein concentrate is to be used.

The process of the invention has been described hereinbefore without any mention of a stage for the removal of the cell walls. At least as far as yeast protein concentrate is concerned, hitherto no objections have been encountered from the nutrition point of view or the toxicological point of view. Indeed, in many instances the cell walls can even constitute an advantage where foodstuffs preparations are concerned because they impart a certain degree of body to the product. However, should there be some reason to suspect that substances which are unsuitable in the nutrient context are occurring in association with the cell walls, then the latter can be removed either before or after the incubation stage. Preferably the removal will be carried out prior to the incubation stage because this results in a better protein yield. In other words, should the removal be carried out after the incubation stage, then a certain quantity of the protein which has been rendered insoluble during incubation, will be removed at the same time. Irrespective of the stage at which the removal is carried out, it should be performed at a pH value of between 5 and 10, preferably between 7 and 9, where the major part of the protein is present in solution. Removal is carried out in a conventional way, in the manner discussed earlier on in association with the separation of the protein concentrate.

As mentioned earlier, the mechanical disintegration can be carried out in a continuous manner, if desired. This also extends, however, to all the other stages such as incubation, separation, removal and drying, meaning that the whole process according to the invention can be performed either in batch fashion or continuously.

In accordance with the invention, protein concentrates can be obtained which contain up to about 70% by weight of the nitrogen in the starting cell mass, and an RNA content of less than 1.5% by weight.

The invention will now be described in more detail in the form of the following examples which are not intended in any way to limit the scope of the invention.

EXAMPLE 1

5 kg of a cell mass (dry substance) of Saccharomyces cerevisiae, with 7% of RNA and 8% of nitrogen, are suspended in water to 100 liters at room temperature. The cells are disintegrated in a disintegrator equipped with glass beads having a diameter of 0.50 to 0.75 mm. The pH value is 5.8. Common salt is added to a concentration of 5% by weight. The suspension is heated to 50° C and maintained at this temperature for 20 minutes. The suspension is cooled and the pH value reduced to 4 by the addition of HCl. The suspension is separated in a centrifugal separator. The viscid phase is washed once with 50 liters of water. From the washed viscid phase, 3.5 kg of dry substance forming the protein concentrate and containing 1.5% of RNA and 8% of nitrogen, are obtained.

EXAMPLE 2

10 kg of a cell mass (dry substance) of Saccharomyces carlsbergensis, containing 6% of RNA and 8% of nitrogen, are suspended in water to 100 liters at room temperature. The cells are disintegrated in a Manton-Gaulin pressure homogenizer. The pH value is 6.2. Potassium chloride is added to a concentration of 2% by weight. The suspension is heated to 65° C and maintained at this temperature for 15 minutes. The suspension is cooled and the pH value reduced to 4 by the addition of HCl. The suspension is diluted to 200 liters using water, and separation is carried out in a centrifugal separator. The viscid phase is washed once with 50 liters of water. The washed viscid phase yields 7.0 kg of dry substance forming the protein concentrate and containing 3.8% of RNA and 7.8% of nitrogen.

EXAMPLE 3

5 kg of a cell mass (dry substance) from a methanoloxidizing Pseudomonas bacterium, with 10% of RNA and 9.5% of nitrogen, are suspended in water to 100 liters at room temperature. The cells are disintegrated in a disintegrator equipped with steel balls having a diameter of 0.15 to 0.25 mm. The pH value is 6.0. Disodium hydrogen phosphate is added to a concentration of 1% by weight. The suspension is heated to 38° C and maintained at this temperature for 30 minutes. The suspension is cooled and separated in a centrifugal separator. The viscid phase is washed once with 50 liters of water. From the washed viscid phase, 3.5 kg of dry substance forming the protein concentrate and containing 6% of RNA and 10% of nitrogen, are obtained.

EXAMPLE 4

5 kg of a cell mass (dry substance) of Saccharomyces cervisiae, with 7% of RNA and 8% of nitrogen, are suspended in water to 100 liters at room temperature. Common salt is added to a concentration of 3% by weight. The cells are disintegrated in a disintegrator equipped with glass beads having a diameter ranging from 0.50 to 0.75 mm. The pH value is 5.8. The suspension is heated to 60° C and maintained at this temperature for 15 minutes. The suspension is cooled and the pH value reduced to 4 by the addition of HCl. The suspension is separated in a centrifugal separator. The viscid phase is washed once with 50 liters of water. From the washed viscid phase, 3.3 kg of dry substance forming the protein concentrate, and containing 2.0% of RNA and 8.8% of nitrogen, are obtained.

EXAMPLE 5

5 kg of a cell mass (dry substance) of a microorganism isolated from earth, probably Candida yeast, containing 7.5% of RNA and 7.5% of nitrogen, are suspended in water to 100 liters at room temperature. The cells are disintegrated in a disintegrator equipped with glass beads having a diameter ranging from 0.50 to 0.75 mm. Common salt is added to a concentration of 3% by weight. The pH value is adjusted using NaOH to a value of 7. The suspension is heated up to 50° C and maintained at this temperature for 20 minutes. The suspension is cooled and the pH value reduced to 4 by the addition of HCl. The suspension is separated in a centrifugal separator. The viscid phase is washed once with 50 liters of water. From the washed viscid phase, 3.3 kg of dry substance forming the protein concentrate and containing 3.5% of RNA and 8.5% of nitrogen, are obtained.

We, claim:

1. A process for preparing from a microbial cell mass a protein concentrate having a low nucleic acid content, consisting essentially of forming a suspension of the cell mass, subjecting the suspended cell mass to a mechanical disintegration treatment at a temperature less than 70° C to activate the endogeneous enzyme, incubating the suspension in the presence of a salt which is acceptable for human consumption, the incubation being performed at a temperature within the range of 30°–70° C and a pH within the range of 5–9, and separating the protein concentrate.

2. The process of claim 1 wherein the mechanical disintegration treatment is performed in a homogenizer containing milling particles.

3. The process of claim 1 wherein the mechanical disintegration treatment is performed in a pressure homogenizer.

4. The process of claim 1 wherein the suspension is incubated in the presence of sodium chloride as the salt.

5. The process of claim 1 wherein the salt is used in an amount of 0.1 to 20% by weight based upon the weight of the suspension.

6. The process of claim 5 wherein the salt is used in an amount of 0.1 to 5% by weight.

7. The process of claim 6 wherein the salt is used in an amount of 1 to 3% by weight.

8. The process of claim 1 wherein the suspension is incubated at a temperature within the range of 40°–65° C.

9. The process of claim 8 wherein the suspension is incubated at a temperature within the range of 48°–62° C.

10. The process of claim 1 wherein the suspension is incubated at a pH within the range of 5–7.

11. The process of claim 10 wherein the suspension is incubated at a pH within the range of 5–6.

12. The process of claim 1 wherein prior to incubation, the cell walls degraded by the mechanical disintegration treatment, are removed.

13. The process of claim 12 wherein the cell walls are removed at a pH within the range of 7–9.

14. The process of claim 1 wherein after incubation the pH value is lowered to below 5 in order to increase the protein precipitation.

15. The process of claim 1 wherein the separated protein concentrate is washed with water in order to remove degradation products and the salt.

16. The process of claim 1 wherein the separation of the protein concentrate is carried out by centrifugal separation.

17. The process of claim 12 wherein the cell walls are removed by centrifugal separation.

18. The process of claim 1 wherein yeast suitable for human consumption is used as the microbial cell mass.

19. The process of claim 1 wherein bacteria suitable for human consumption are used as the microbial cell mass.

20. The process of claim 18 wherein Saccharomyces yeast is used as the microbial cell mass.

21. The process of claim 18 wherein Candida yeast is used as the microbial cell mass.

22. The process of claim 19 wherein methane-oxidizing bacteria are used as the microbial cell mass.

23. The process of claim 19 wherein methanol-oxidizing bacteria are used as the microbial cell mass.

24. The process of claim 20 wherein a cell mass of Saccharomyces cerevisiae is used.

25. The protein concentrate obtained by the process of claim 1.

* * * * *